US012677807B2

(12) United States Patent
Nguyen et al.

(10) Patent No.: US 12,677,807 B2
(45) Date of Patent: Jul. 14, 2026

(54) MULTI-FUNCTION DEVICE FOR INTENSIVE SHRIMP FARMING, INTENSIVE SHRIMP FARMING POND USING THIS DEVICE AND METHOD FOR OPERATING THIS POND

(71) Applicant: RYNAN TECHNOLOGIES—VIETNAM JOINT STOCK COMPANY, Tra Vinh City (VN)

(72) Inventors: My Thanh Nguyen, Tra Vinh City (VN); Toan Quoc Tran, Duyen Hai District (VN); Khanh Vu Vo, Tra Cu District (VN); Viet Quoc Vo, Tra Vinh City (VN); Binh Thai Pham, Duyen Hai District (VN); Hao Le Nhut Huynh, Giong Rieng District (VN); Luom Hoang Pham, Long Ho District (VN); Quy Minh Phan, Tra Vinh City (VN); Thuan Huynh, Tra Vinh City (VN); Cuong Quoc Hong, Tra Vinh City (VN); Duy Huynh Ngoc To, Tra Vinh City (VN); Chau Minh Bui, Thoi Binh District (VN); Trinh Thi Tu Nguyen, Cang Long District (VN); Dang Bao Pham, Ninh Kieu District (VN); Thao Duy Phuong Thai, Ninh Kieu District (VN)

( * ) Notice: Subject to any disclaimer, the term of this patent is extended or adjusted under 35 U.S.C. 154(b) by 0 days.

(21) Appl. No.: 18/710,750

(22) PCT Filed: May 18, 2023

(86) PCT No.: PCT/IB2023/055105
§ 371 (c)(1),
(2) Date: May 16, 2024

(87) PCT Pub. No.: WO2024/028661
PCT Pub. Date: Feb. 8, 2024

(65) Prior Publication Data
US 2025/0318508 A1 Oct. 16, 2025

(30) Foreign Application Priority Data
Aug. 1, 2022 (VN) .............................. 1-2022-04867

(51) Int. Cl.
*A01K 61/59* (2017.01)
*A01K 61/85* (2017.01)
(Continued)

(52) U.S. Cl.
CPC .............. *A01K 61/59* (2017.01); *A01K 61/85* (2017.01); *A01K 63/042* (2013.01); *A01K 63/047* (2013.01); *A01K 63/06* (2013.01)

(58) Field of Classification Search
USPC ....... 119/200, 204, 207, 208, 210, 211, 212, 119/221, 234, 238, 242
See application file for complete search history.

(56) References Cited

U.S. PATENT DOCUMENTS 4,027,627 A * 6/1977 Fillion .................. A01K 61/80
119/57.91
6,187,194 B1 * 2/2001 Byrne ...................... C02F 3/06
210/612

(Continued)

FOREIGN PATENT DOCUMENTS

CN 112450148 * 3/2021 ........... A01K 63/006
CN 214892675 * 11/2021
(Continued)

OTHER PUBLICATIONS

International Search Report, dated Jul. 27, 2023, International Application No. PCT/IB2023/055105, 4 pages.
(Continued)

*Primary Examiner* — Andrea M Valenti
(74) *Attorney, Agent, or Firm* — Smith Keane LLP

(57) ABSTRACT

Provided are a multi-function device for intensive shrimp farming, intensive shrimp ponds using this device and method for operating this pond. The multi-function device of the present invention comprises: water flow generator; feeder unit; gas dissolving unit; sensor and control operating the entire device. The intensive shrimp pond of the present invention comprises at least one multi-function device and has a reasonable operating method that uses algae and microorganisms to keep the dissolved oxygen (DO) concentration in the pond always high and the pH in the pond stable at an optimal threshold.

16 Claims, 15 Drawing Sheets

(51) Int. Cl.
    *A01K 63/04*          (2006.01)
    *A01K 63/06*          (2006.01)

(56)                References Cited

U.S. PATENT DOCUMENTS

| | | | |
|---|---|---|---|
| 12,137,673 B2 * | 11/2024 | Nguyen | A01K 63/042 |
| 2001/0045189 A1 | 11/2001 | McNeil | |
| 2003/0154926 A1 | 8/2003 | Untermeyer et al. | |
| 2004/0149234 A1 | 8/2004 | Mathur et al. | |
| 2005/0172910 A1 * | 8/2005 | McMillan | A01K 63/04 |
| | | | 119/226 |
| 2006/0162667 A1 * | 7/2006 | Papadoyianis | A01K 61/60 |
| | | | 119/223 |
| 2011/0308473 A1 * | 12/2011 | Buchanan | A01K 61/60 |
| | | | 119/226 |
| 2019/0045756 A1 | 2/2019 | Liu et al. | |
| 2021/0045364 A1 * | 2/2021 | Huang | A01K 61/85 |
| 2022/0087234 A1 | 3/2022 | Donners | |

FOREIGN PATENT DOCUMENTS

| | | | | |
|---|---|---|---|---|
| CN | 114586727 | * | 6/2022 | A01K 61/80 |
| DE | 102008008329 | | 8/2009 | |
| IT | LE20030020 | * | 4/2005 | |
| JP | 200625729 | * | 2/2006 | Y01A 40/81 |
| SU | 1143362 | * | 3/1985 | Y02A 40/81 |
| WO | 02082895 | | 10/2002 | |
| WO | WO 2013159340 | * | 10/2013 | A01K 63/06 |

OTHER PUBLICATIONS

Written Opinion, dated Jul. 27, 2023, International Application No. PCT/IB2023/055105, 6 pages.

* cited by examiner

AUTOTROPHIC:

$NH_4^+ + 1.83\ O_2 + 1.97\ HCO_3^- \longrightarrow 0.024\ C_5H_7O_2N + 0.976\ NO_3^- + 2.90\ H_2O + 1.86\ CO_2$

HETEROTROPHIC:

$NH_4^+ + 1.18\ C_6H_{12}O_6 + HCO_3^- + 2.06\ O_2 \longrightarrow C_5H_7O_2N + 6.06\ H_2O + 3.07\ CO_2$

PHOTOAUTOTROPHIC:

$16\ NH_4^+ + 92\ CO_2 + 92\ H_2O + 14\ HCO_3^- + HPO_4^{2-} \longrightarrow C_{106}H_{263}O_{110}N_{16}P + 106\ O_2$ $16\ NO_3^- + 124\ CO_2 + 140\ H_2O + HPO_4^{2-} \longrightarrow C_{106}H_{263}O_{110}N_{16}P + 138\ O_2 + 18\ HCO_3^-$

MULTI-FUNCTION DEVICE FOR INTENSIVE SHRIMP FARMING, INTENSIVE SHRIMP FARMING POND USING THIS DEVICE AND METHOD FOR OPERATING THIS POND

FIELD

The invention relates to a multi-function device for intensive shrimp farming, intensive shrimp pond using this device and method for operating this pond. The pond of the invention can be used for shrimp farming in general, but it is better to be used for whiteleg shrimp farming. The pond of the invention is a specialized automatic intensive shrimp farming system which help to achieve high productivity and yield.

BACKGROUND

Due to climate change, the Mekong Delta is increasingly affected by saltwater intrusion and to adapt to this, brackish water should be considered as a new resource. Using this new resource for shrimp farming is one possible option.

On Jan. 18, 2018, the Prime Minister issued Decision No. 79/QD-TTg with the goal of exporting USD 8.4 billion of brackish water shrimp by 2025, of which 80% of revenue comes from the Mekong Delta. However, the Vietnam Association of Seafood Exporters and Producers (VASEP) predicts that, with current shrimp farming technology, shrimp farming output may reach only $5.6 billion by 2025.

Current shrimp farming technology has inherent disadvantages related to the amount of dissolved oxygen in shrimp pond water. There are five main factors that affect shrimp ponds, which are sunlight, dissolved oxygen (DO) concentration, pH, density of algae and microorganisms, and among them, the amount of dissolved oxygen in water is very important and necessary to enable the use of large amounts of feed in intensive shrimp farming. Most of the dissolved oxygen in water is used by the aerobic microorganisms in shrimp ponds to break down the proteins in shrimp droppings, leftovers and the organic compounds released during shrimp farming. Dissolved oxygen in water provides the oxygen necessary for aquatic animals, which is beneficial for the growing proliferation of aerobic microorganisms, which promotes decomposition of organic substances, reduces toxic substances, inhibits the activity of harmful anaerobic microorganisms, and boosts the immunity of shrimp. Low dissolved oxygen has a negative impact on shrimp's ability to catch prey and digest food. One of the methods used to help increase the amount of dissolved oxygen in shrimp ponds is to use mechanical systems to create oxygen for the pond.

Mechanical oxygen generating systems commonly used in Vietnam and other countries comprise of air blower and ceramic or plastic air diffuser located at the bottom of the pond (see FIG. 1), and a paddle wheel device floating on the water (see FIG. 2) to mix air that contains about 20.5% oxygen into the water. The paddle wheel device is also used to centrifuge dead shrimp, shrimp shells, shrimp droppings and organic compounds to the siphon system, which is then periodically sucked out of the pond.

During operation, the air blower will suck in and blow air through the diffusers to form bubbles that rise to the surface of the water. The paddle wheels on the water surface rotate to rip water into small droplets to increase the contact area between the air and the water to increase the dissolved oxygen in water.

The rate of dissolution of oxygen from the air into the water is described by the gas transfer equation below:

$$dC/dt = K_1 \cdot \left(A/V\right) \cdot (C_s - C_m)$$

In which: dC/dt is the dissolution rate of oxygen in the air into the water;

$K_1$ is the water surface refresh constant depending on the turbulence rate of water;

A is the contact surface area between water and air of shrimp pond;

V is the water volume of shrimp pond;

$C_s$ is the saturated oxygen concentration depending on the temperature and salinity conditions of water, in the Mekong Delta $C_s$ has a value of about 7.6 mg/L;

$C_m$ is the measured oxygen concentration in the water.

In practice, the oxygen generation system which consists of air blowers and a paddle wheel device operates 24 hours a day continuously to dissolve oxygen into the water. However, the dissolved oxygen concentration $C_m$ in water never exceeds the saturation oxygen concentration $C_s$ because when $C_m$ equals $C_s$, then dC/dt=0. In other words, the rate of oxygen from the air dissolving into the water is equal to the rate of the oxygen in the water evaporates into the air. Simultaneously, the current use of mechanical oxygen generation systems is very energy intensive. An average of 4,500 to 5,500 kWh of electricity is needed to dissolve oxygen for one ton of shrimp harvested in one crop. In addition, shrimp ponds with mechanical oxygen generation systems also have disadvantages:

Causing serious noise pollution for people working and living near shrimp farms;

Breaking shrimp droppings and leftovers into very fine particles that are dispersed into the water. In combination with the almost flat pond bottom and the presence of air diffuser clusters, it is very difficult to collect these fine particles of organic waste to siphon out;

Creating airborne particles carrying pathogens that are transmitted by wind to nearby shrimp ponds;

Blowing away the large amount of dissolved oxygen molecules in the water synthesized from photosynthesis by algae during the daytime (to achieve a saturated dissolved oxygen concentration);

Many diffuser clusters have micro holes and blown air placed on the bottom of the pond, which is the ideal medium for the rapid growth of *vibrio*.

Therefore, the brackish shrimp farming industry urgently needs a type of shrimp farming system that can easily collect water-insoluble organic waste and operate at a higher dissolved oxygen concentration in the pond than the saturated oxygen concentration ($C_s$) to effectively biodegrade organic waste in water, in order to increase the density of shrimp culture per $m^2$ in intensive shrimp farming industry and reduce electrical energy and water consumption.

In addition to the DO factor in the pond, the pH factor of the water also needs to be considered. The pH of the water in the shrimp pond needs to be maintained at a stable level to avoid fluctuations. At present, it is very hard to control this factor because conventional shrimp ponds do not regularly manage pH, only taking necessary measures when the pH is too high or too low.

SUMMARY

The first purpose of the present invention is to overcome limitations related to dissolved oxygen concentrations in shrimp ponds. To achieve this goal, according to one aspect of the invention, there is provided a multi-function device used for intensive shrimp farming, the device comprising:

water flow generator for creating water flows in layers with a decreasing volumetric flow rate from the bottom to the surface of the shrimp pond;

feeder unit for providing food for shrimp;

gas dissolving unit for dissolving oxygen molecules into the water of shrimp pond.

According to some embodiments, water flow generator includes a body, an impeller placed inside the body, a motor driving the impeller through a drive shaft to help stirring the water flow, wherein the body having a screw-shaped tubular structure.

According to some embodiments, the feeder unit includes a container, a lid located above the container, a sensor located inside the container which can sense the amount of food remaining in the container, a feed output located below the container, a feed dosing motor configured to measure and deliver precise amounts of feed into shrimp ponds.

According to some embodiments, the gas dissolving unit includes a porous ceramic tube with a hollow part inside, an upper stopper and a lower stopper placed at two ends of the porous ceramic tube, three bolts and three rivets to tighten the upper and lower stop and fix the porous ceramic tube, an inlet configured in the upper stop connecting to the hollow part inside the porous ceramic tube.

According to some embodiments, the multi-function device further includes:

a sensor assembly allows measurement of water quality indicators selected in the group of dissolved oxygen concentration, pH, salinity, water temperature, turbidity, sunlight or combinations thereof;

controller for operating the multi-function device, which connects and communicates with other components via wiring and/or wireless communication such as Wifi, 3G, 4G, 5G or LoRa, wherein said controller being operable to receive, from the sensor assembly, system data information, then determines and adjusts the appropriate parameters, and transmits the information to the components to enable the components to operate according to defined parameters.

According to other aspect, the present invention provides a shrimp pond including:

siphon system including a central hole at the lowest position of the pond, preferably this lowest position is designed with a slope of 5% to 12% of the radius of bottom surface of the pond; a system of pipes connected to the central hole to lead organic matter in the shrimp pond out;

at least one multi-function device as above described;

a floating roof system on the pond surface;

a light system providing artificial light.

According to some embodiments, the shrimp pond further includes a system of seaweed-culturing cage wherein the seaweed-culturing cage has a rectangular-prism frame made of PVC pipes and the surrounding and bottom surfaces thereof are covered by plastic net.

According to some embodiments, the system of floating roof includes the floating roof and the submerged pump, wherein the floating roof has a rectangular frame which is buoy pipes made of PVC, the middle surface of the frame is a waterproof cover made of HDPE with a thickness of at least 0.5 mm and a light transmittance over 40%; and the submerged pump is placed in the middle of the cover.

According to some embodiments, the light system includes LED lights, each LED light includes plural of LED bulbs, among which there is ⅓ amount of blue LED bulb and ⅔ green LED bulb and LED light system and sunlight provide light for at least 14 hours per day.

The shrimp pond according to the invention always has a very high DO due to the following reasons:

Although the gas dissolving unit is simple structure, its ability to diffuse oxygen is effective because the oxygen used in this invention with higher purity than the oxygen in the air is blown through a porous ceramic tube with many sponge holes. This unit is placed in the deep-submerged water flow generator near the bottom of the pond. In combination with the density of oxygen gas ($dO_2$=1.43 g/L) heavier than water ($dH_2O$=1.00 g/L), oxygen molecules disperse quickly and stay longer in water. The ratio of flow rate of water flow (L/min) and oxygen flow rate (L/min) is preferred to be greater than 5,000 to increase the efficiency of dissolving molecular oxygen in water. In addition, the gas dissolving unit and water flow generator are arranged properly to help dissolved oxygen circulate throughout the shrimp pond. A preferred oxygen flow rate in systems according to the present invention is 0 to 180 g/min. A preferred flow rate of water flow is between 0 and 20 m3/min.

The use of algae helps to increase the amount of DO in the pond because when algae are photosynthesizing during day-time, a large amount of oxygen is produced as shown in the reaction diagram in FIG. 13. Algae also decompose organic waste in the form of NH4+ and NO3− in photoautotrophic process in the absence of light, causing increase of biomass which is natural food for shrimp.

The floating roof system of the pond significantly reduces the amount of oxygen diffusing into the air.

Another purpose of the present invention is to control the pH of the pond through the operation of the shrimp pond by using biological principles. Accordingly, the present invention provides a for operating the shrimp pond by using algae, microorganisms and CaO or other alkaline substances to regulate pH of the pond, in which algae and/or alkaline agents act as pH-raising agents and microorganisms act as pH-reducing agents, in detail:

algae and/or alkaline agents (base or basic oxide), preferably selected from a group consisting of NaOH, KOH, $Ca(OH)_2$, $Na_2O$, $K_2O$ and CaO or combinations thereof, are added when the pH of the pond is lower than optimal value;

and microorganisms are added when the pH of the pond is higher than optimal value, wherein the optimal value of pH is between 7.5 and 8.0.

Preferably, algae and micro-organisms are added at the right rate and CaO is only added at night-time or when sunlight intensity is low.

According to one embodiment:

when pH<7.5, add CaO and reduce the amount of microorganism added;

when 7.5<pH<8.0 (optimal), the amounts of algae and microorganisms is in balance and no additional factors are added;

when 8.0<pH<8.5, reduce the amount of algae added; and when pH>8.5, stop adding algae to the pond until the pH returns to the optimal value.

In general, the shrimp pond according to present invention is an ideal combination of components and systems together, in addition with a reasonable operating helping to synergize the benefits that make shrimp farming become intensive and high efficiency. The shrimp farming model using shrimp ponds according to present invention needs to be replicated to help increase the overall productivity of the shrimp farming industry.

BRIEF DESCRIPTION OF DRAWINGS

FIG. 15 is a diagram showing the parameters in the experimental shrimp ponds from $12^{th}$ to $26^{th}$ day of culture, in which

FIG. 16 is a diagram showing the parameters in shrimp ponds from the 40th to 70th day of culture, in which

DETAILED DESCRIPTION

The scope of protection of the invention will become clearer with the following detailed description. However, it should be understood that detailed descriptions and specific examples, which indicate preferred embodiments of the invention, are given for illustrative purpose only, and the present invention is not limited thereto. The various modifications and changes within the scope and spirit of the invention is obvious to those skilled in the art to which the present invention pertains.

Shrimp Pond 100

Figure 1:
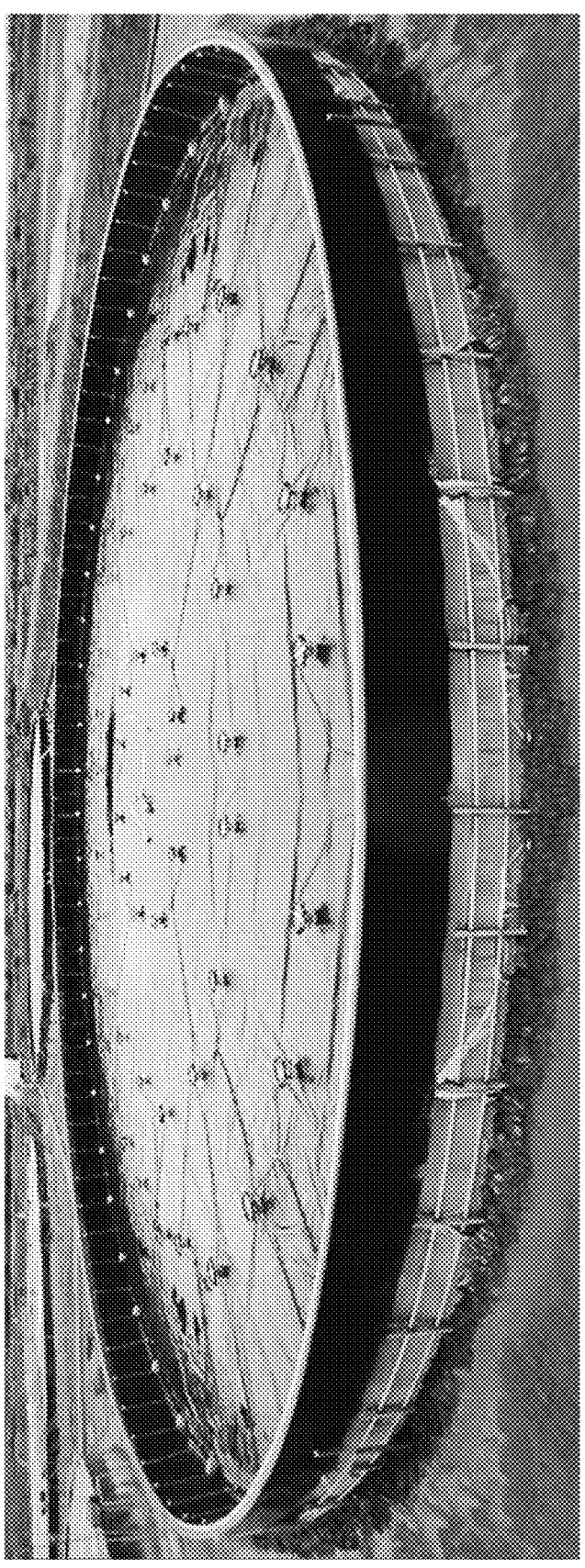
FIG. 1 shows a traditional shrimp pond without water and it is clear to see oxygen diffusers located at the bottom of the pond.
Figure 2:
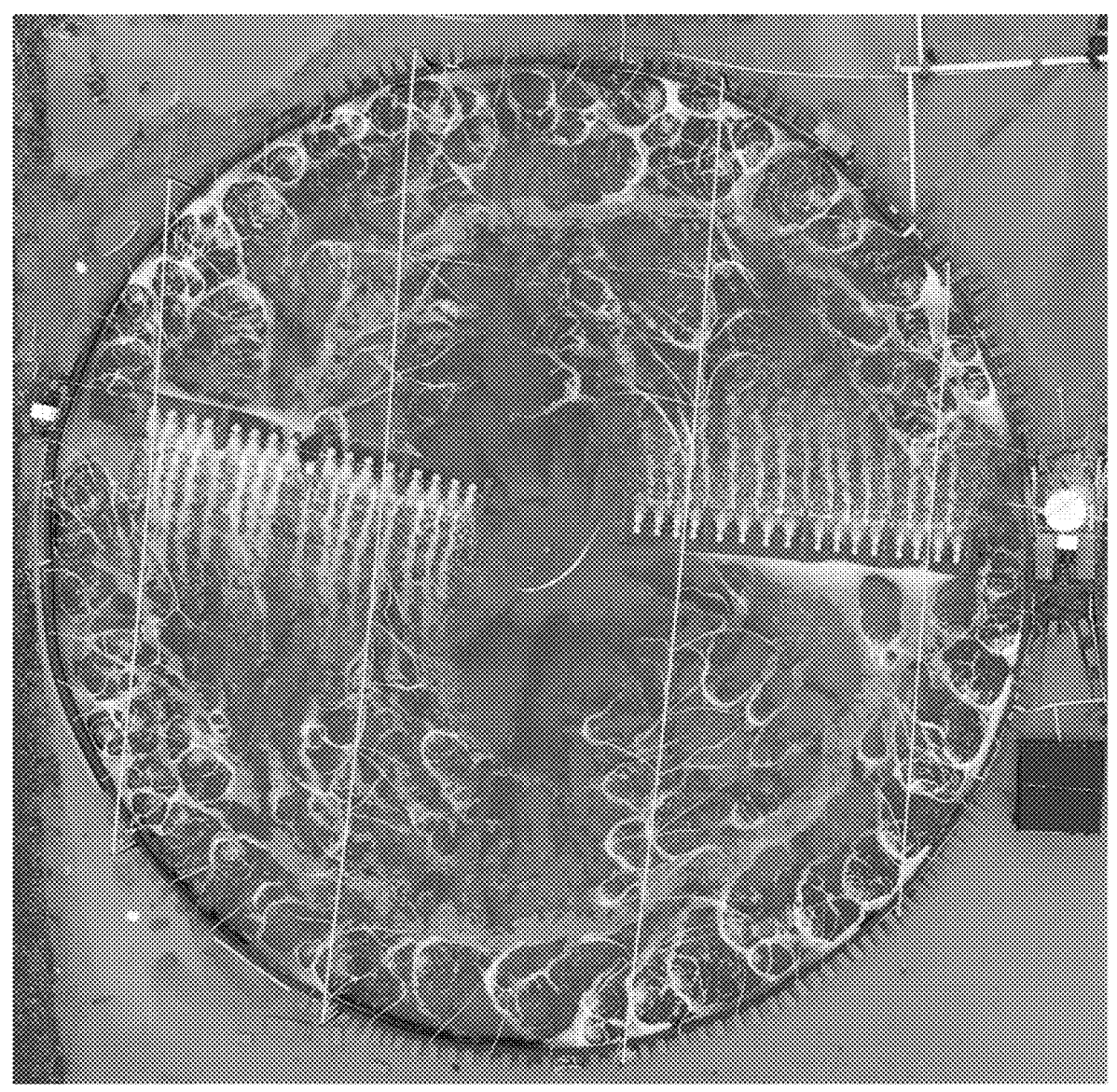
FIG. 2 show a traditional shrimp pond with water and it is clear to see that paddle wheels are rotating.
Figure 3:
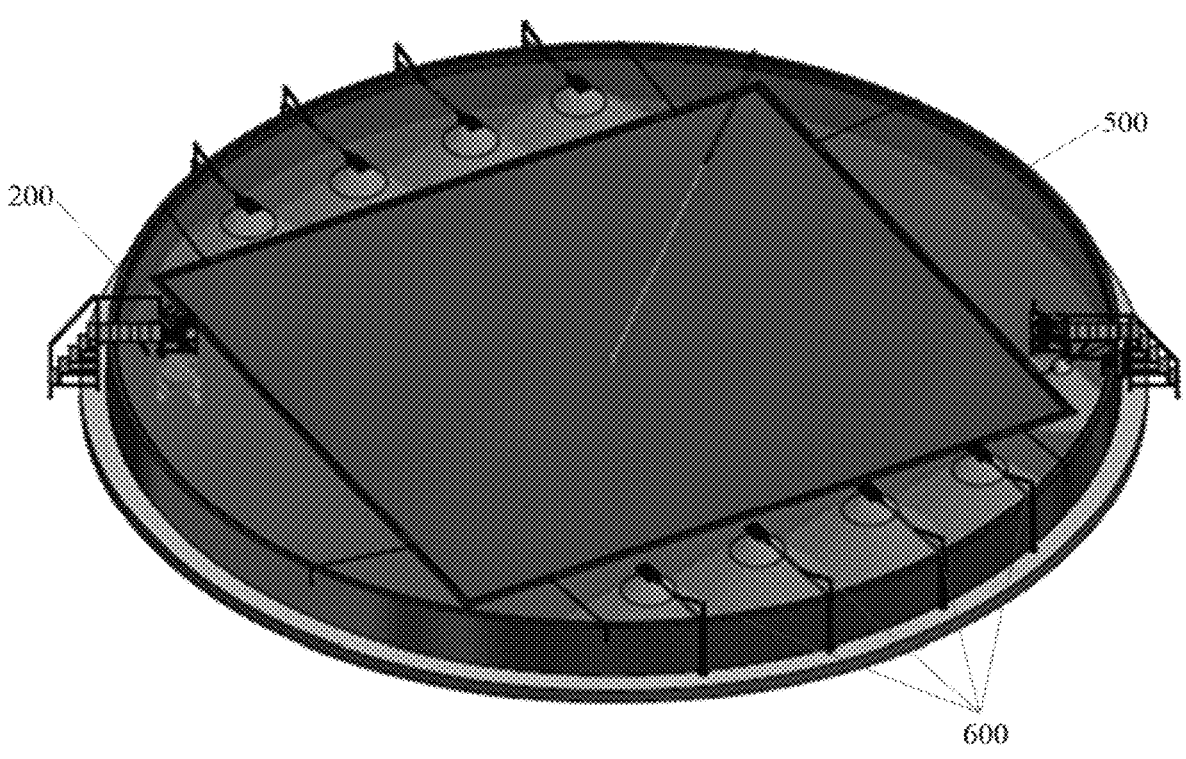
FIG. 3 shows a shrimp pond according to present invention in the form of tarpaulin-lined steel frame pond.
Figure 4:
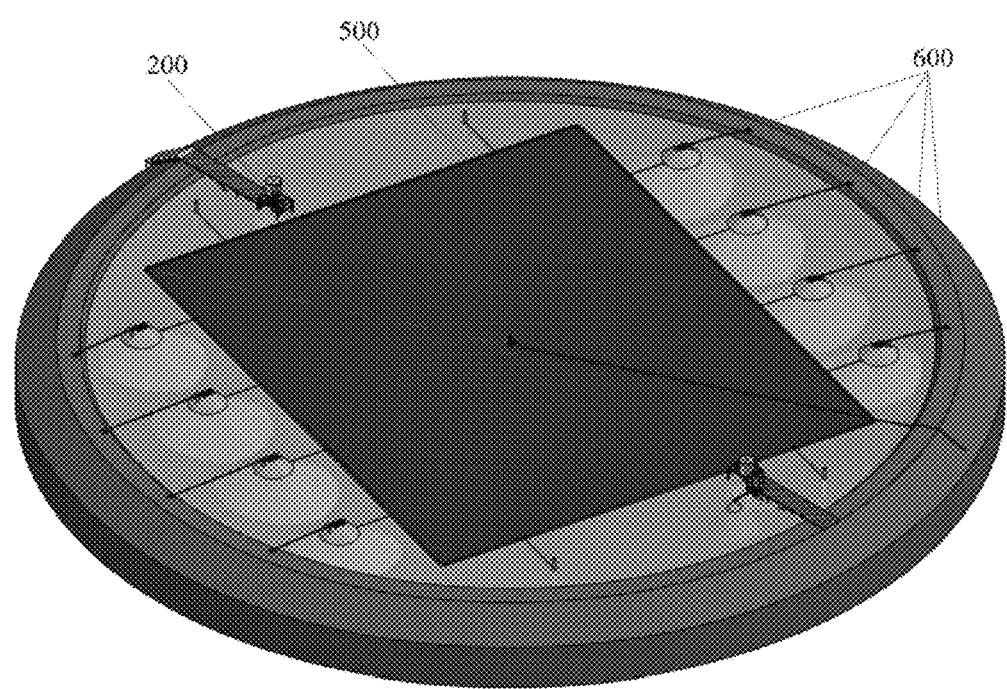
FIG. 4 shows a shrimp pond according to present invention in the form of tarpaulin-lined soil pond.

Refer to FIG. 3 and FIG. 4, shrimp pond 100 has a cylinder shape, i.e. have a circular surface, but it is not limited to that, specifically shrimp pond 100 can have other shapes of surface such as rectangular, square or polygonal shape depending on needs and scale ordered by shrimp farm owners. Once shaped, the shrimp pond 100 will be lined with high density polyethylene (HDPE) tarpaulin covering at least the inner surface of the pond to hold water and culture the shrimp in it. The pond can be shaped by erecting a frame around and then covering it with HDPE tarpaulin on the inner surface (tarpaulin-lined steel frame pond, FIG. 3) or digging the soil forming shape of pond and then covering the excavated surface with HDPE tarpaulin (tarpaulin-lined soil pond, FIG. 4). In respect of tarpaulin-lined steel frame pond, the pond structure will likely sink into the soil, in contrast, in respect of tarpaulin-lined pond soil, the pond structure will emerge above the ground.

Figure 5:
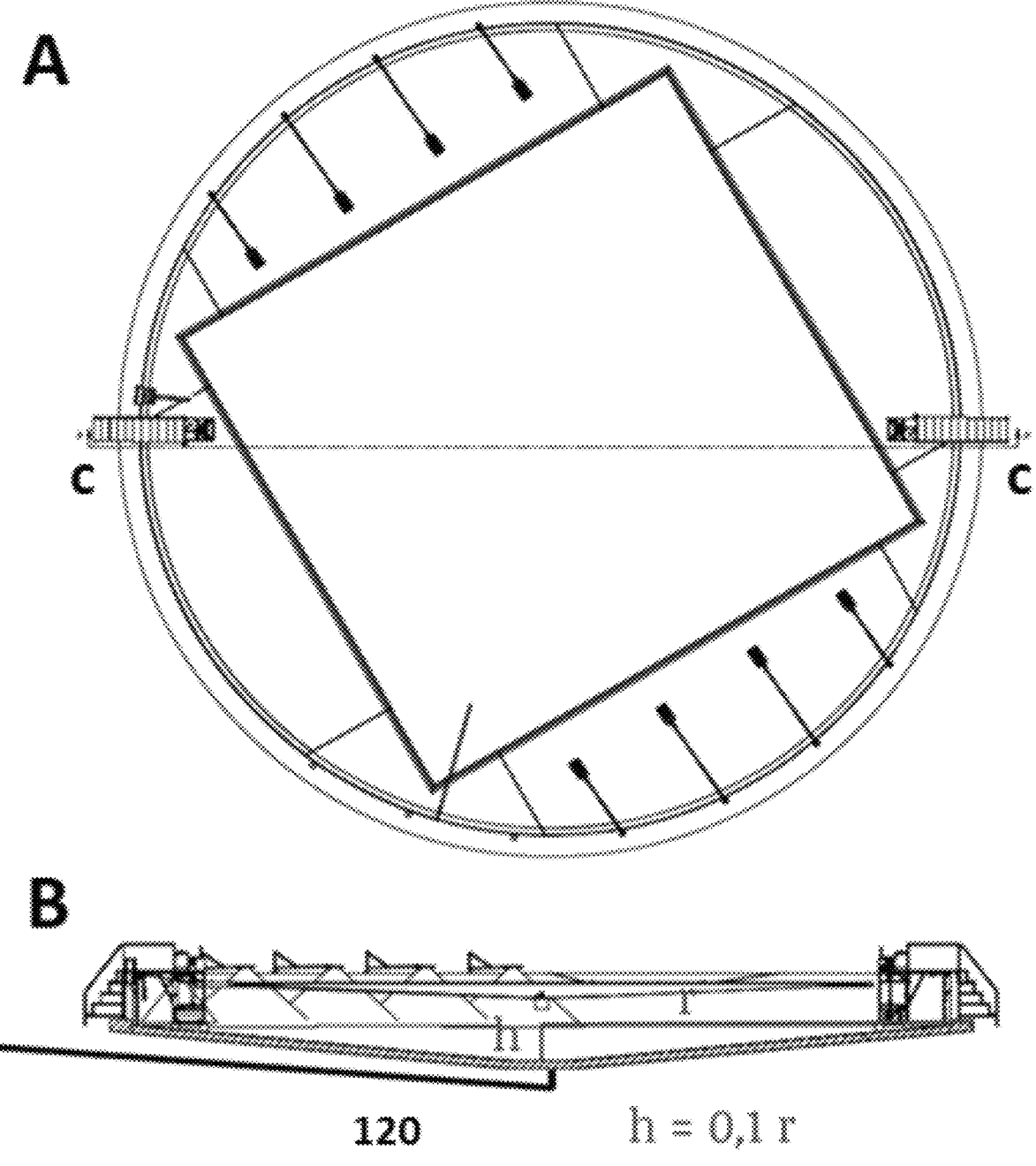
FIG. 5A is flat view of the shrimp pond in FIG. 3.
FIG. 5B is C-C cross-sectional view of the shrimp pond in FIG. 5A, showing the siphon structure at the bottom of the pond.

Refer to FIG. 5B, shrimp pond 100 preferably have a siphon structure. The siphon structure is the bottom structure of the pond shaped like a funnel, high at the outer edge, gradually lower inward and low in the center. In this low part, the siphon system 120 is provided and includes a central hole located at the bottom of the pond, this central hole connects to a system of pipes to lead organic matter in the shrimp pond out. Due to the funnel-shaped design, plus the multi-function device creating a vortex of below floor water of the pond, organic matter tends to settle into the central hole and follow the system of pipes to be discharged outside. The end of the system of pipes has a locking valve, when opening the lock valve, because the central hole is at the lowest point of the pond, the water pressure here is also the highest, which will push the organic substances out without any additional force. In addition, to prevent shrimp from being gone with the water out through the siphon system, a dome-shaped mesh device will be placed above the central hole, the mesh size is suitable for organic matter and water to pass through but the shrimp is stopped.

Multi-Function Device 200

Figure 6:
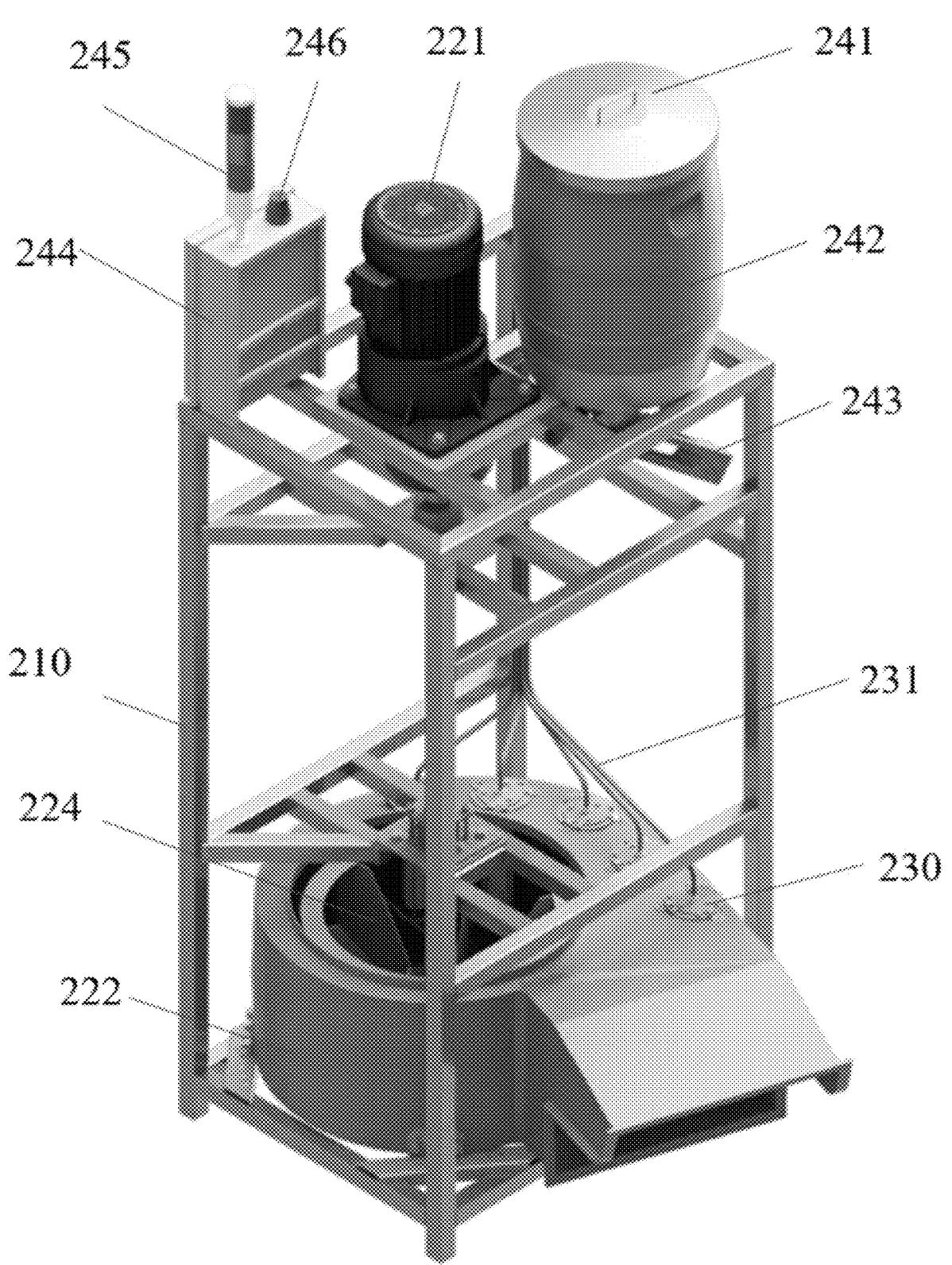
FIG. 6 shows a multi-function device according to an embodiment of present invention.

Refer to FIG. 6, according to an embodiment, the multi-function device 200 of the present invention includes a support frame 210, a water flow generator 220, gas dissolving unit 230, the feeder unit 240.

The water flow generator 220 is located close to the bottom of the shrimp pond 100. Said water flow generator 220 comprises impeller 224 which is driven by the motor 221 for stirring to create the water flows (3.7-5.5 kW, 380 V) through drive shaft 223; outside of the impeller 224 is the body 222 of the water flow generator 220, the body 222 is in a screw-shaped tubular structure that is convenient for creating and guiding water flows. The flow generator 220 is designed to create water flows in layers with a decreasing volumetric flow rate from the bottom to the surface of the shrimp pond. Preferably, the water flow generator 220 is operated at volumetric flow rate where the water at the air-water interface has the slowest possible flow rate to avoid any turbulence that could increase diffusing oxygen in the water into the air. Preferably, the volumetric water flow rate is between 50 and 1,000 $m^3/h$ for intensive shrimp pond 100 containing brackish water from 100 to 2,000 $m^3$.

Figure 8:
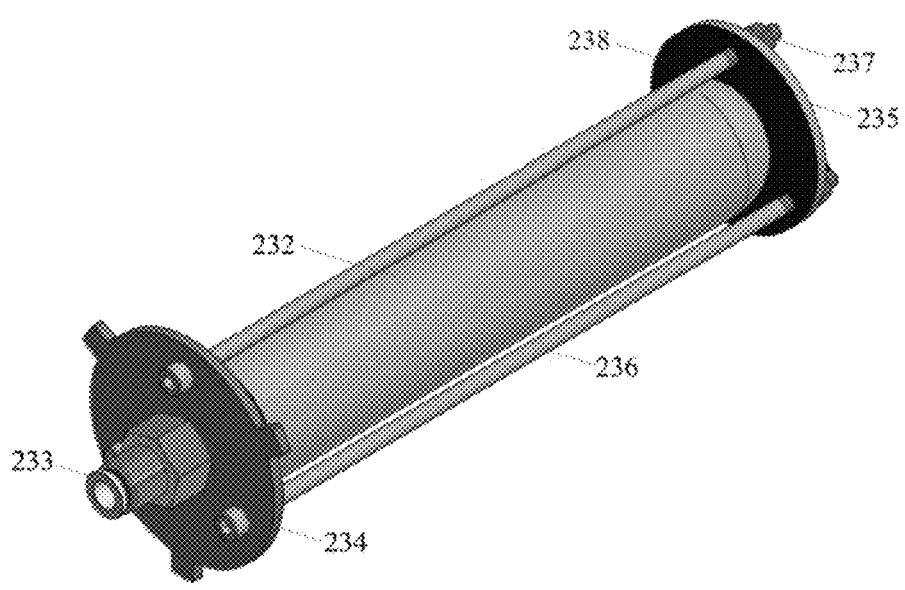
FIG. 8 shows the structure of gas dissolving unit of a multi-function device.
Figure 9:
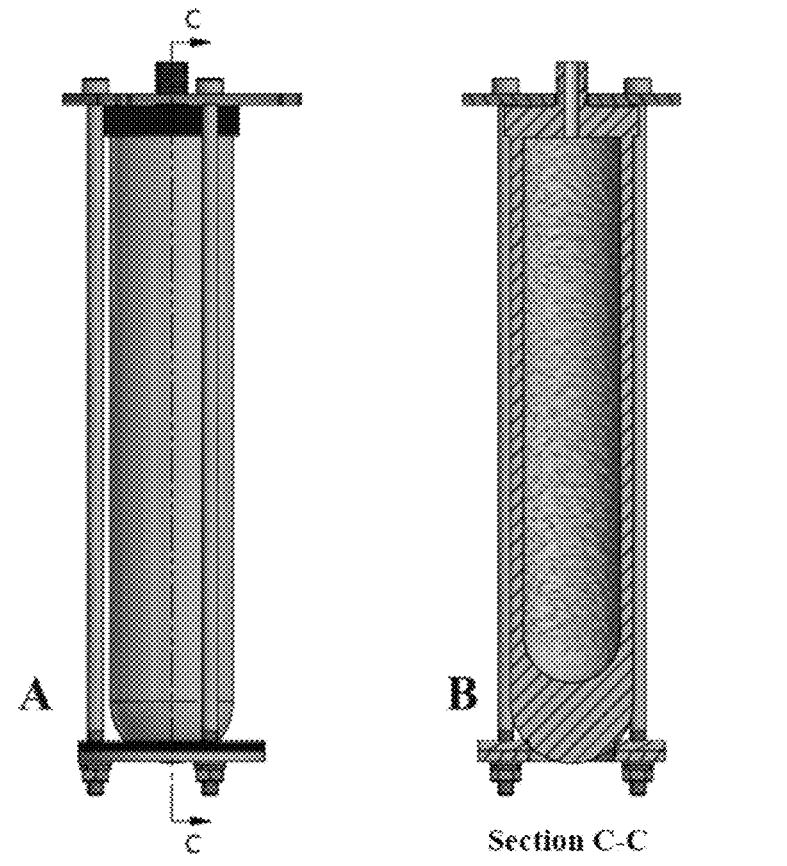
FIG. 9A is elevational view of the gas dissolving unit on FIG. 8.
FIG. 9B is the C-C cross-sectional view of the gas dissolving unit on FIG. 9A.

Refer to FIG. 6, the multi-function device 200 of the present invention includes (but is not limited to) five gas dissolving unit 230 for dissolving molecular oxygen in water which are located inside the body 222 and adjacent to the impeller 224 of water flow generator 220. Gas dissolving unit 230 is connected to the pure oxygen supply device (not shown in the figures) via air conduit 231. Refer to FIG. 8 and FIG. 9, gas dissolving unit 230 includes a porous ceramic tube 232 having partially hollow part inside (FIG. 9) and solid part with micro-sponge pores to help oxygen diffuse into the environment of pond, an upper stopper 234 and a lower stopper 235 are placed at both ends of the porous ceramic tube 232, combined with three bolts 236 and three rivets 237 to fix the porous ceramic tube 232. Above the lower stopper 235 is a rubber buffer plate 238 to prevent porous ceramic tube 232 from direct contacting the lower stopper 235 which may cause breakage. An inlet 233 located in the upper stopper 234 connects to the hollow part inside the porous ceramic tube 232, helping to introduce molecular oxygen into this part.

Feeder unit 240 is used for providing industrial and functional food for shrimp. Refer to FIG. 6, according to an embodiment of the present invention, the feeder unit 240 comprises a container 242 basically in cylindrical shape (but not limited to that), above the container 242 there is a lid 241, inside the container 242 there is a sensor 256 for sensing the amount of food remaining in the container 242, below the container 242 there is a feed output 243. The feed output 243 is a square box-shaped tube (but not limited) and can be directed straight down or diagonally toward outside. In addition, on the top of the feed output 243, a motor for feed-dosing can be arranged to measure and supply an accurate amount of feed into shrimp pond 100. According to an embodiment, feeder unit 240 is operated directly by control box 244, in detail, control box 244 of feeder unit 240 has the function of dosing and feeding according to predetermined schedule. In addition, control box 244 may include indicator light 245 and antenna 246. Indicator light 245 and antenna 246 connect to control box 244 to respectively generate alarm signals in different modes and transmit information with the control box.

Figure 7:
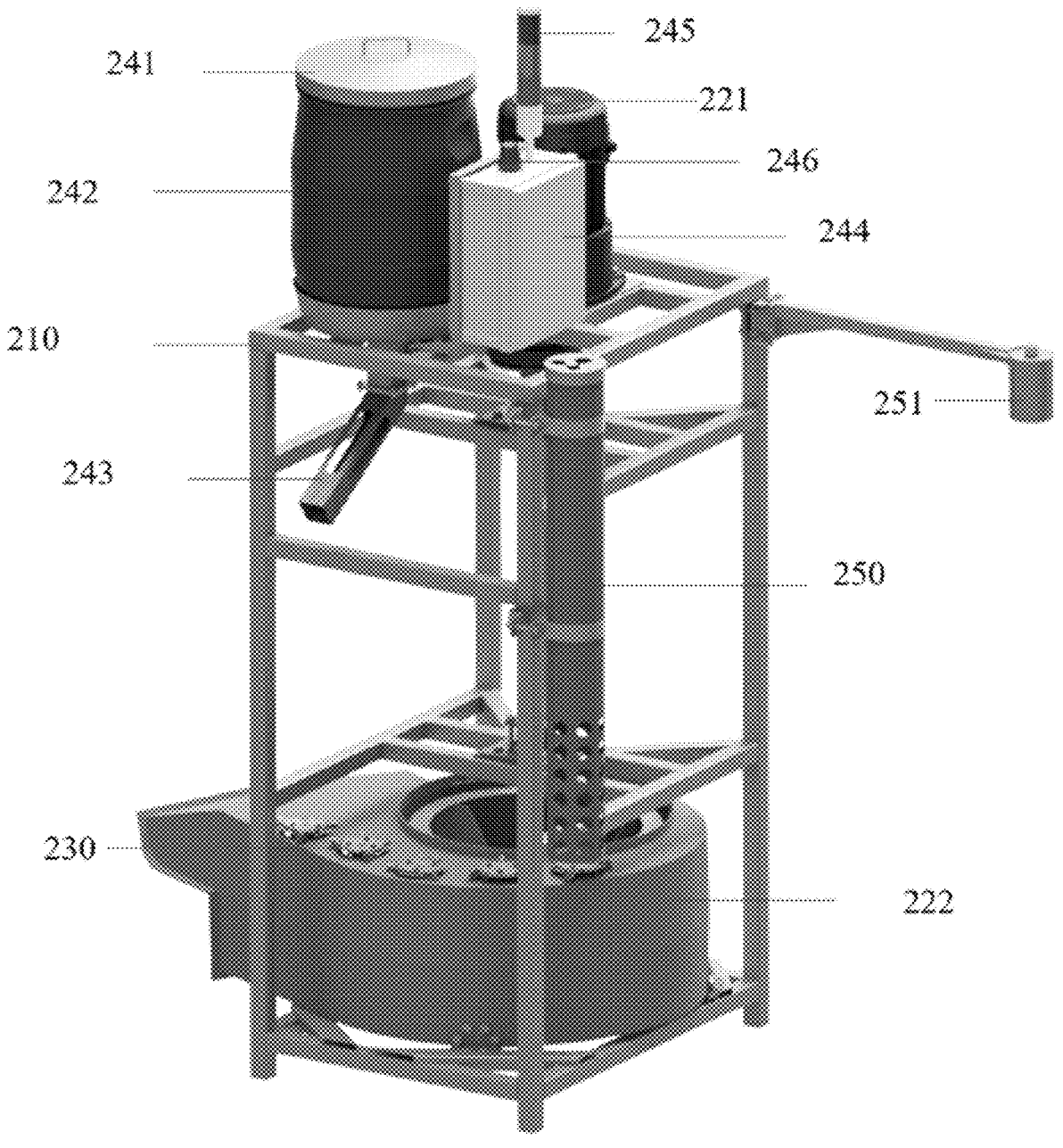
FIG. 7 shows a multi-function device according to another embodiment of present invention.

Refer to FIG. 7, according to one embodiment, the multi-function device includes a sensor assembly 250. The sensor assembly is designed in the form of a cylinder (but not limited to that), one end (bottom) of sensor assembly 250 is submerged in water of shrimp pond 100, inside this end there are sensor chips, the other end (upper) has a wire connection to transmit information to the electronic controller 260. The sensor assembly 250 of the present invention is used to measure pH, salinity, dissolved oxygen concentration, water level and algae concentration . . . of water in shrimp pond 100. According to one embodiment, the sensor assembly 250 also includes a sensor 251 that measures a single indicator of shrimp ponds located far away from the main part of the sensor assembly 250, for example, the sensor 251 used to measure pond water levels is located far away from the main part of the sensor assembly 250 used to measure factors of DO, pH, salinity, . . . . In addition, the sensor may not need to be attached to the frame of the multi-function device, but placed away from the multi-function device, as long it can still communicate with the controller 260 described below.

According to some embodiments, a controller 260 is provided for operating the whole multi-function device 200. Said controller 260 connects and communicates with other components via wiring and/or wireless communication such as Wifi, 3G, 4G, 5G or LoRa. Said controller 260 has a processor being operable to receive, from the sensor, system data information, then analyze and determine the appropriate parameters for shrimp pond 100, and transmit the signal to the components to enable the components to operate according to defined parameters. Specifically, sensor assembly 250 measures quality indicators of water in shrimp pond 100, the measured values will update to the controller 260 every 15 to 180 minutes. The processor of the controller 260 will analyze, evaluate, and then make appropriate operating requirements for the multi-function device 200 and the entire system in general. For example, when the dissolved oxygen concentration value falls below the "allowed value", the data is transmitted to the controller 260 for analysis and then the controller 260 turns on pure oxygen supply device 300 to deliver oxygen through the gas dissolving unit 230 to the water column inside the body 222 of the water flow generator 220 to dissolve into the pond. When the concentration of dissolved oxygen in water increases above the "allowable value", the sensor assembly 250 will transmit information to the controller 260 for analyzing and then the controller 260 stops pure oxygen supply device 300, this mechanism is to control the concentration of dissolved oxygen in the water at the allowable threshold and save energy. The controller 260 with integrated microprocessor can operate the entire system independently, however the invention is not limited by that. As mentioned above, inside the control box is an electrical circuit, connected to the internet via Wifi, 3G, 4G, 5G and LoRa, so the controller 260 can completely connect and communicate with an external server and/or users can remotely control the operation of the system indirectly through the controller 260. Similar to the sensor assembly 250, the control unit 260 does not need to be mounted on the frame of the multi-function device, it can be placed on the pond wall to facilitate repair as well as human intervention, as long as is that it still communicates with other parts of the multi-function device 200.

In addition, the controller 260 may control devices other than the multi-function device 200. For example, refer to FIG. 6, the control unit is configured with two cabinets, the left cabinet is to control the multi-function device 200 and the right cabinet is to control a water supply pump with the function of turning on/off the pump for supplying water to the pond.

Pure Oxygen Supply Device

The intensive shrimp pond of present invention may also include a device that provides molecular oxygen gas with a purity higher than the concentration of oxygen in the air (~20.5%). Preferably, the purity of molecular oxygen is higher than 30%. More preferably, the purity of molecular oxygen is higher than 85%.

The device used in this invention, based on pressure swing adsorption technology, is manufactured by RYNAN® Technologies Vietnam under the name of RYNAN® OXYGEN GENERATOR M150. The device is capable of producing oxygen up to 150 kg/day, the average flow can supply up to five ponds at 35-40 grams/min.

In addition to the pure oxygen supply device 300, it is possible to set up the pure carbon dioxide supply device (not shown) to provide the $CO_2$ gas into the shrimp pond 100. This device works in some specific cases, with the purpose of providing carbon dioxide for algae, because during photosynthesis, algae use carbon dioxide to produce oxygen molecules.

Floating Roof System 500

Inside the pond, there is a floating roof system 500 in contact with the water surface. The floating roof system 500 includes a floating roof 510 with a frame of buoy pipes made of PVC (or PP, PE and other materials) to help the floating roof always float on the water. The frame of floating roof can be rectangular (square or other shape, . . . ) occupying most of the surface area of the shrimp pond 100, the middle surface of the frame is a waterproof cover made of HDPE with a thickness of at least 0.5 mm and a light transmittance over 40%, in the middle of the cover there is a submerged pump 520 (below supported by a circular piece of stainless steel or stainless steel placed on a buoy), the body of the submerged pump is configured to connect the pipe 530 to discharge the rainwater out of the pond; The floating roof tensioner is arranged at four conners of the floating roof and be stretched tight to the wall of the pond. The floating roof system 500 helps to reduce dissolved oxygen loss and fluctuations in dissolved oxygen levels in the water, reduce water temperature changes, reduce the amount of light that is not beneficial to shrimp, reduce changes in pH due to reduced algal photosynthesis and reduce water quality impacts because the floating roof is configure to capture rainwater.

Light System 600

The intensive shrimp farming pond of this invention may also include a light system 600 with the purpose of stimulating shrimp to eat more industrial food when the light is on.

According to an embodiment, the light system 600 includes 8 LED lights 610 arranged on opposite sides, close to the pond wall and curved towards the pond surface at both ends of the pond. Each LED light 610 has 24 panels, each panel has 6 LED bulbs. Thus, each LED light 610 has a total of 144 LED bulbs, including 48 blue LED bulbs and 96 green LED bulbs.

The light system and the sun provide light for at least 14 hours a day. The light system uses blue (wavelength of about 450 nm) and green (wavelength of about 510 nm) light bulbs to help shrimp grow quickly and have a high survival rate. The light system provides artificial light to change the cycle and eating habits of shrimp with industrial and natural food, change shrimp behavior, stimulate molting and eat more industrial food in present of blue and green light.

Seaweed-Culturing System 700

Figure 10:
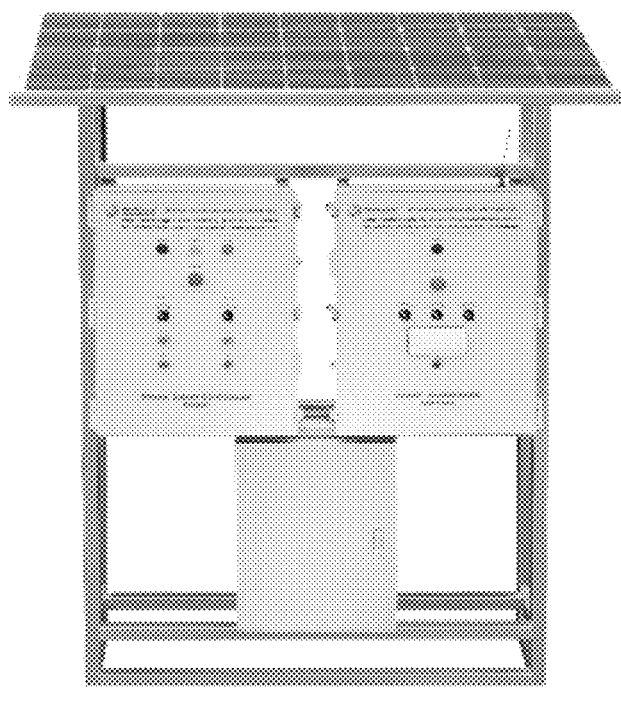
FIG. 10 shows a controller of a multi-function device according to an embodiment of the present invention.
Figure 11:
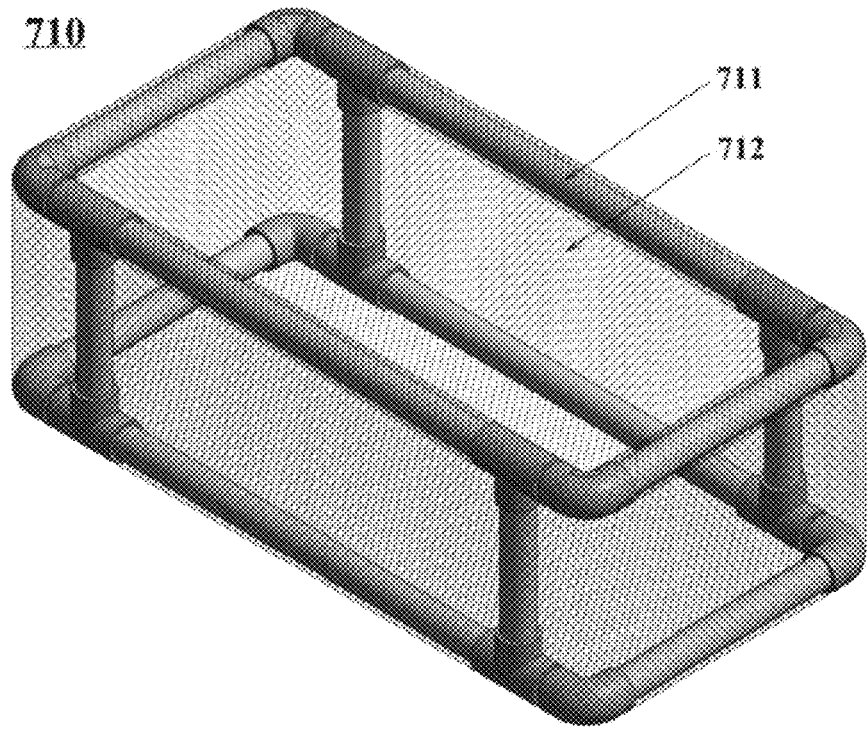
FIG. 11 shows the structure of a seaweed-culturing cage.
Figure 12:
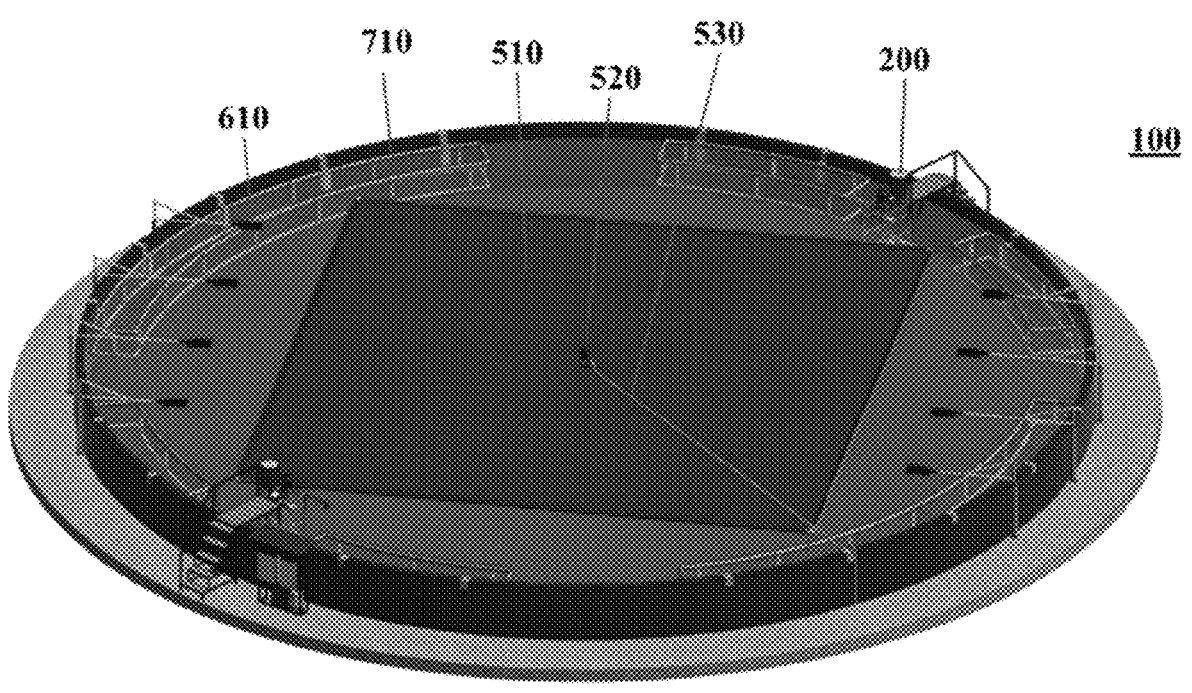
FIG. 12 is a perspective view of shrimp pond according to an embodiment of the present invention, clearly showing the structure of floating roof system, light system and system for culturing seaweed.

Refer to FIG. 10 and FIG. 11, according to some embodiments, shrimp pond 100 also includes an additional seaweed-culturing system 700. Referring to FIG. 11, each seaweed-culturing cage 710 consists of composed of PVC pipes connected to form a rectangular-prism frame 711, the surrounding and bottom surfaces thereof are covered by plastic net 712. The seaweed-culturing system 700 can be arranged around and right next to the pond wall (FIG. 12) or arranged around the four sides of the floating roof. Seaweed-culturing cage is used to culture some types of seaweed that are beneficial to shrimp, helping to decompose organic waste such as $NH_4^+$ and $NO_3^+$ dissolved in water, and add to the culture environment, enriching shrimp's natural food sources, creating additional oxygen through photosynthesis, reducing toxic gas and keeping shrimp healthy. The priority seaweed cultured in the cage of this invention includes *Porphyra* spp., *Porphyra palmaria, Porphyra palmata, Porphyra dioica, Porphyra umbilicalis, Chondrus crispus, Osmundea pinnatifid, Gracilaria chilensis, Gracilaria gracilis, Gelidium corneum, Sargasum maclurei, Fucus vesiculosus, Fucus spiralis, Saccharima latissima, Bifurcaria bifurcata, Undaria pinnatifida, Ulva* spp., *Ulva rigida, Ulva lactuca, Ulva capensis, Cladophora rupestris* and others.

Setting Mode and Operating the Multi-Function Device 200

The multi-function device 200 basically has three main functions: providing food, providing molecular oxygen and creating water flow. The mode setting and operation of the multi-function device 200 is directly and mainly related to these three functions. Specifically, according to some embodiments, the multi-function device is set up and operated as follows:

setting mode of feeding: according to manual or automatic mode. Manual mode is feeding by volume and time, for example feed 100 g and pause, 5 minutes after feed again, and keep on until the user stops feeding. In automatic mode, feeding is according to schedule, in the schedule (time frame), there will be a configuration of the feeding cycle and the amount of food. More specifically, in the automatic mode, the device automatically turns on, feeds according to the predetermined cycle, the device automatically turns off at the end of the feeding cycle in this day, and in the next day the device continues to operate the cycle again. Manual mode requires human intervention: a worker turns on the device and then sets a mode, the worker has to manually turn off the device to stop the mode, in the next day, if he wants to turn on the device again, the worker has to manually turn on and set a mode again.

setting mode of oxygen supply: pure oxygen supply device is configured to pump oxygen into the pond so that DO is always >7.0 mg/L, preferably DO>8.0 mg/L.

setting mode and operating the water flow generator 220 so that the output water flow is between 0-18 $m^3$/min. the ratio of flow rate of water flow and oxygen flow rate is preferred to be at least 70,000.

Setting Mode and Operating Light System 600

The light system 600 is set up so that lights and sunlight provide light for at least 14 hours a day. According to a priority embodiment, on/off mode of the lights is set as follows: turn on the blue light at 0 am (gradually brightening from 0% to 100% in the first 30 minutes), then turn off the blue light at 1 am and turn on green light at 0 am (gradually brightening from 0% to 100% in the first 60 minutes), then turn of the green lights at 7 am.

Operating Floating Roof System 500

Floating roof system including floating roof and submerged pump is used from 0-30 days or 0-40 days old of shrimp, after this time the floating roof will be removed from shrimp pond 100. Purpose of operating the floating roof is mainly to reduce the loss of oxygen molecules into the air, reduce water temperature changes, reduce sunlight intensity and absorb rainwater on the cover of the roof during or after rain. In addition, the connecting roof needs to be cleaned periodically every week or when dirty dust arises.

Operating Siphon System 120

As described above, the siphon structure is like a funnel, organic residues (shrimp droppings, shrimp shells, shrimp carcasses, leftovers, . . . ) in the pond are accumulated to the central hole of the siphon system 120 thanks to water flows in layers with a decreasing volumetric flow rate from the bottom to the surface of the shrimp pond. Depending on the age of the shrimp, every 2 hours or 1 hour, the lock valve of the siphon system is open once so that the water pushes all the residue down the central hole. Waste is collected at the central hole and goes out through the pipe system. According to one embodiment, discharge volume for a pond of 1,000 $m^3$ is 20-100 $m^3$/day, which is about 2% to about 10% of the total volume of the pond per day.

After or during discharge, it is necessary to add equal amount of discharged water to the shrimp pond. This additional water source can be taken advantage of from discharged water of previous siphon process. In detail, the shrimp ponds are siphoned/water changed every day to remove the culture water and add new water. Wastewater is discharged from the central hole, followed the sewage pipe system and gone directly into the mangrove forest. Here, due to actions of mangroves and microorganisms in the forest, wastewater will be treated, go out at the end of the mangrove forest and return to the input water purification system. At the end of the mangrove forest, the water is checked for salinity, pH, turbidity, alum, alkali, Ca, Mg, NO2, NO3, PO4 before entering the filter system.

Using Algae and Alkaline Agents (Base or Basic Oxide)

Figure 13:
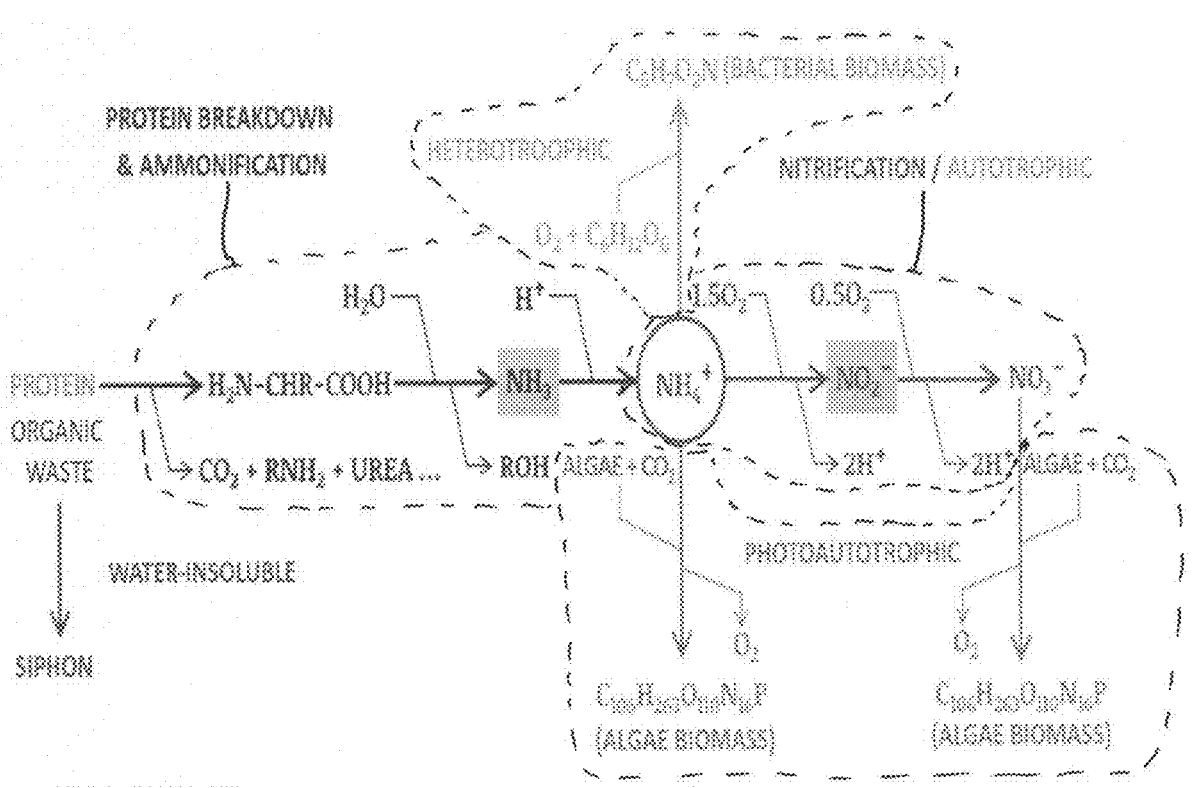
FIG. 13 is a diagram showing the decomposition of organic matter in shrimp ponds.

Beside DO, pH in the pond is also a factor that needs to be paid attention to and maintained at an optimal level. The optimum pH in shrimp ponds is 7.5-8.0. Refer to FIG. 13 which describes the organic matter degradation pathway in shrimp ponds that has a great influence on pH in the pond. The main organic waste in shrimp ponds is protein, including water-soluble and water-insoluble. In shrimp ponds according to the invention, the water-insoluble type is settled and removed from the pond thanks to the siphon structure, and the water-soluble type will be treated mainly with biological materials including microorganisms and algae. The used microorganisms are heterotrophs and autotrophs, while the used algae are phototrophs. Water-soluble organic matter undergoes the following biodegradation process: first through proteolysis and ammonification, which converts nitrogen into $NH_3$ and then to $NH_4^+$ by heterotrophic organisms such as *Bacillus* spp., then through nitrification cycle by main microorganisms such as *Nitrosomonas* and *Nitrobacter*, this process consumes $O_2$ in the pond and produces $CO_2$ and $H^+$, which decreases the pH. Meanwhile, algae, with phototrophic capacity, can assimilate $NH_4^+$ and $NO_3^-$ to increase biomass, this process consumes $CO_2$ and produces $O_2$, which increases pH by reducing $CO_2$ concentration because $CO_2$ reacts with $H_2O$ according a mechanism: $CO_2+H_2O=>H_2CO_3$, $H_2CO_3<=>H^++CO_3^{2-}$, $CO_3^{2-}+H_2O<=>OH^-+CO_2$, wherein when the concentration of $CO_2$ in water decreases, the reaction will tend towards the formation of alkaline $OH^-$. The preferred algae used in this invention include:

Algas verdes: *Chlorella* sp., Nannochloropsis sp., Scenedesmus sp., Monoraphidium *contortum*, Chlamydomonas sp., Ankistrodesmus sp., *Haematococcus* sp., Dunaliella sp., Oocystis sp., *volvox* sp. và *ulothrix* sp.

Algas diatomeas: Thalassiosira sp., *Chaetoceros* sp., Eunotia sp., Isochrysis sp., Skeletonema sp., *Nitzschia* sp. và *Navicula* sp.

Algas espirulina: *Spirulina* sp.

In summary, microbial activity decreases pH and conversely photosynthetic activity of algae increases pH. However, algae photosynthesize effectively only when it is sunny with a sunlight intensity of about 15-25 Klux, otherwise the algae still respire and decrease pH of the environment, in detail, if sunlight intensity is lower than 15 Klux, the algae do not photosynthesize and if sunlight intensity is more than 30 Klux, photosynthesis of algae is inhibited. Therefore, it is necessary to add an alkaline agent to increase the pH when algae are respiring. The alkaline agent can be a base or a basic oxide, preferably selected from a group consisting of NaOH, KOH, $Ca(OH)_2$, $Na_2O$, $K_2O$ and CaO or combinations thereof.

After studying, the present invention suggests to control of pH in shrimp ponds by using algae, microorganisms and alkaline agents, in which algae and/or alkaline agents act as pH-raising agents when the pH of the environment is lower than optimal value and microorganisms act as pH-reducing agents when the pH is higher than optimal value. Thus, when knowing the pH value of the pond and the trend (up or down) (because the sensor assembly continuously informs about this value), it is completely possible to control this factor in real time. Specifically, it is possible to initially determine the content of algae and microorganisms at the optimal pH of 7.5-8.0, and then control this content at that level, that is, when the pH tends to decrease, algae and alkaline agents are added, and when the pH increases, microorganisms are added.

According to one embodiment, when pH<7.5, add alkaline agent and reduce the amount of microorganism added; when 7.5<pH<8.0 (optimal), the amount of algae and microorganisms is in balance and no additional factors are added; when 8.0<pH<8.5, reduce the amount of algae added; and when pH>8.5, stop adding algae to the pond until the pH returns to the optimum level.

Preferably, algae and microorganisms have a density of $10^3$-$10^6$ cells/ml.

Figure 14:
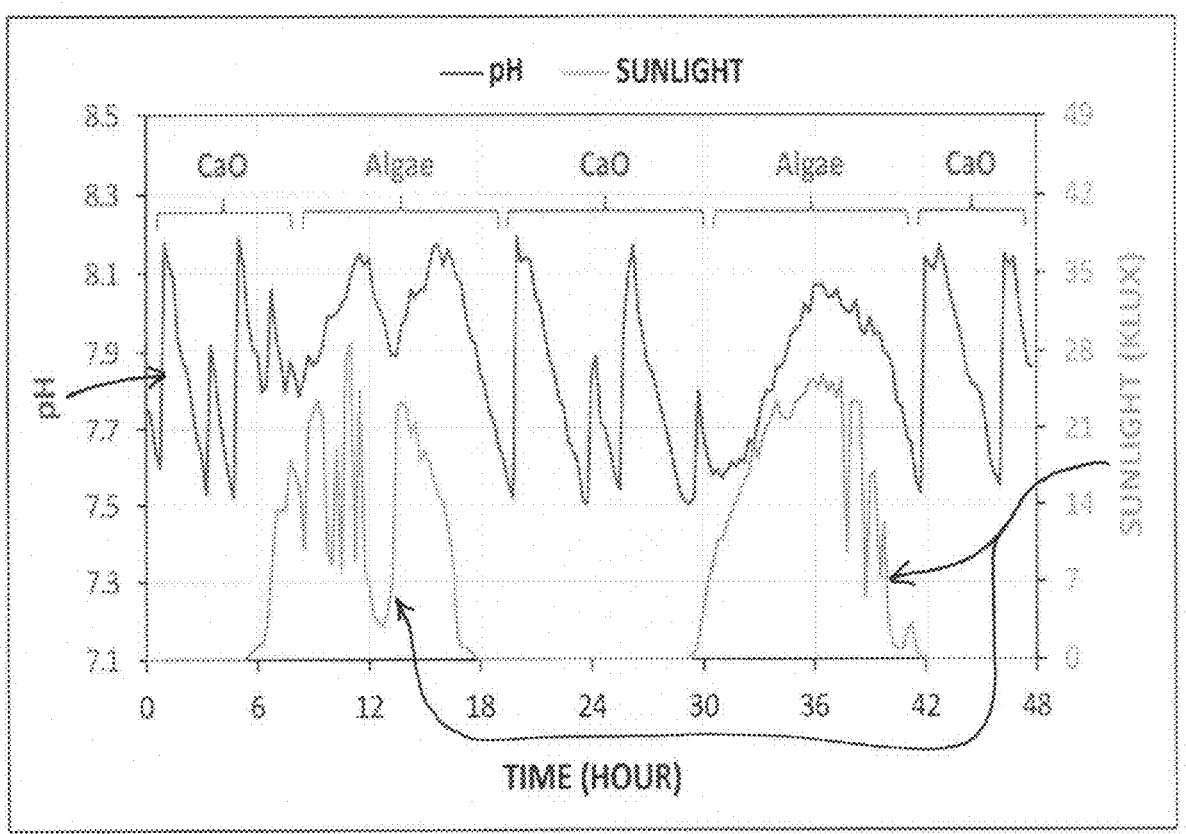
FIG. 14 is a diagram showing the change of pH according to sunlight, using algae and CaO.

The use of algae to increase pH is still preferred over alkaline agents for the following reasons:

Firstly, algae help to increase pH steadily. Refer to FIG. 14 which clearly shows the difference of pH increase due to active algae and CaO addition. When algae are active, the pH will increase slowly, and when adding CaO, the pH will increase rapidly, reach to the desired value at that time. It can be seen that adding CaO to the pond is only needed at night/no sunlight or no photosynthetic activity of algae.

Secondly, the use of photosynthetic algae also helps to increase the oxygen concentration in the pond, reduce gas supply by pure oxygen supply device; electricity and water are economically consumed by not operating the pure oxygen supply device continuously and less changing the water.

Third, algae are a natural food source for shrimp. Shrimp pond is provided with algae to help reduce FCR (e.g. FCR=1.2), shrimp have good meat quality, eye-catching color.

EXAMPLES OF INVENTION IMPLEMENTATION

Experimental Example (Experimental Pond)

In this experimental example, an intensive shrimp farming system is set up with the following conditions and operation modes:

Shrimp Pond

Designed in the form of tarpaulin-lined steel frame pond, in which the pond is basically cylindrical, the pond wall is made of steel frame, HDPE tarpaulin surrounds the steel frame and covers pond bottom, the height of the steel frame is 1.5 m, the bottom is circular in shape with diameter of 23 m, the bottom (starting at the base of the steel frame) is funnel-shaped (siphon structure), the deepest point is the central hole at a depth of about 2.5 m, the pond water volume is 500 $m^3$.

Operating the siphon system: The siphon system is discharged every 1 hour, the discharge volume is 500 to 1,000 L. During or after discharge, clean water is supplied to the pond equally to the amount discharged.

Pure Oxygen Supply Device

The pure oxygen supply device used in this experiment is the RYNAN® OXYGEN GENERATOR M150 provided by RYNAN® Technologies Vietnam (Tra Vinh) with oxygen production capacity of 150 kg/day, the average flow can supply up to five ponds at 35-40 grams/min. Oxygen is supplied to the oxygen diffuser to dissolve in water with a flow rate that can be set automatically according to the desired dissolved oxygen concentration in the water. In this experimental example, the dissolved oxygen concentration in water of shrimp pond was higher than 8 mg/L.

Multi-Functional Device

The shrimp pond is provided with two multi-functional devices, arranged opposite to each other and placed at the end of two bridges leading into the pond from the pond wall. The multi-function device used in the experimental pond (FIG. 7) includes a water flow generator including a body, a motor and an impeller; the feeder unit includes a container and a control box; a gas dissolving unit is connected to a pure oxygen supply device; a sensor assembly having a water level sensor placed far away from the main part of the sensor assembly; a controller capable of receiving signals from the sensor assembly, sending information to the gateway, as well as analyzing and evaluating itself and send control information to operate the entire multi-function device according to predetermined settings.

Setting mode and operating the multifunction device: i) setting feeding mode: according to manual or automatic mode, wherein manual mode is feeding by volume and time as feed 100 g and pause, 5 minutes after feed again, and keep on until the user stops feeding. In automatic mode, feeding is according to schedule, in the schedule (time frame), there will be a configuration of the feeding cycle and the amount of food; ii) setting mode of oxygen supply so that DO is always >7.0 mg/L, preferably DO>8.0 mg/L; iii)—setting mode and operating so that the output water flow is between 0-18 m$^3$/min.

Floating Roof System:

Including a floating roof with a rectangular frame made of PVC pipe, size of 16 m×15 m, in the middle thereof is a waterproof cover made of HDPE with a thickness of 0.5 mm and a light transmittance of 60%, in the middle of the cover there is a submerged pump with a capacity of 1 HP that pumps rainwater out of the cover surface quickly and efficiently.

On rainy days, workers actively pump rainwater out of the floating roof. The floating roof is cleaned periodically. When the shrimp are at 30 or 40 days old, the floating roof can be removed from the shrimp pond.

Light System

Including 08 LED lights, each LED light has a total of 144 LED bulbs, including 48 blue LED bulbs and 96 green LED bulbs.

The light system is set up as follows: blue LED light is turned on at 0 am, gradually brightening from 0% to 100% in the first 30 minutes, then turned off at 1 am; green LED light is turned on at 0 am, gradually brightening from 0% to 100% in the first 60 minutes, then turned off at 7 am.

Figure 15A:
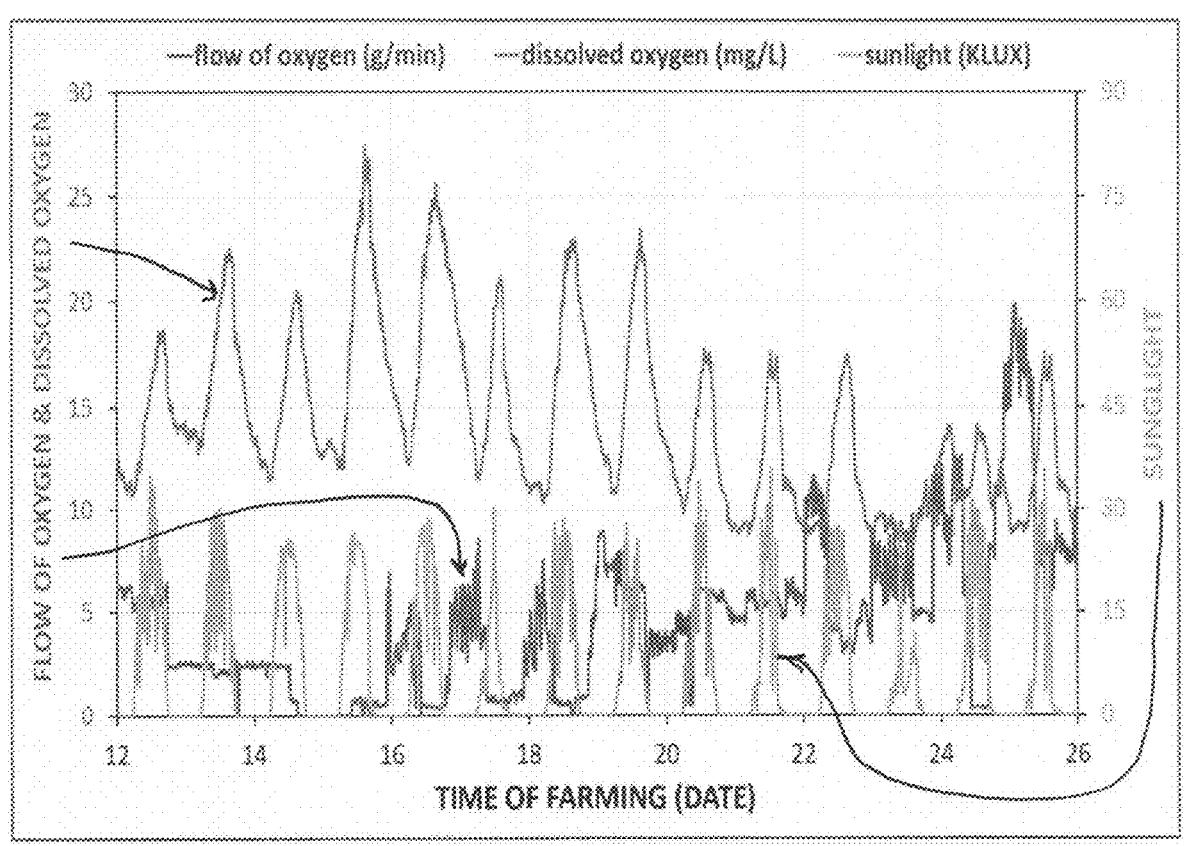
FIG. 15A shows the correlation between oxygen flow (provided by multi-function device), concentration dissolved oxygen in shrimp ponds and sunlight.
Figure 15B:
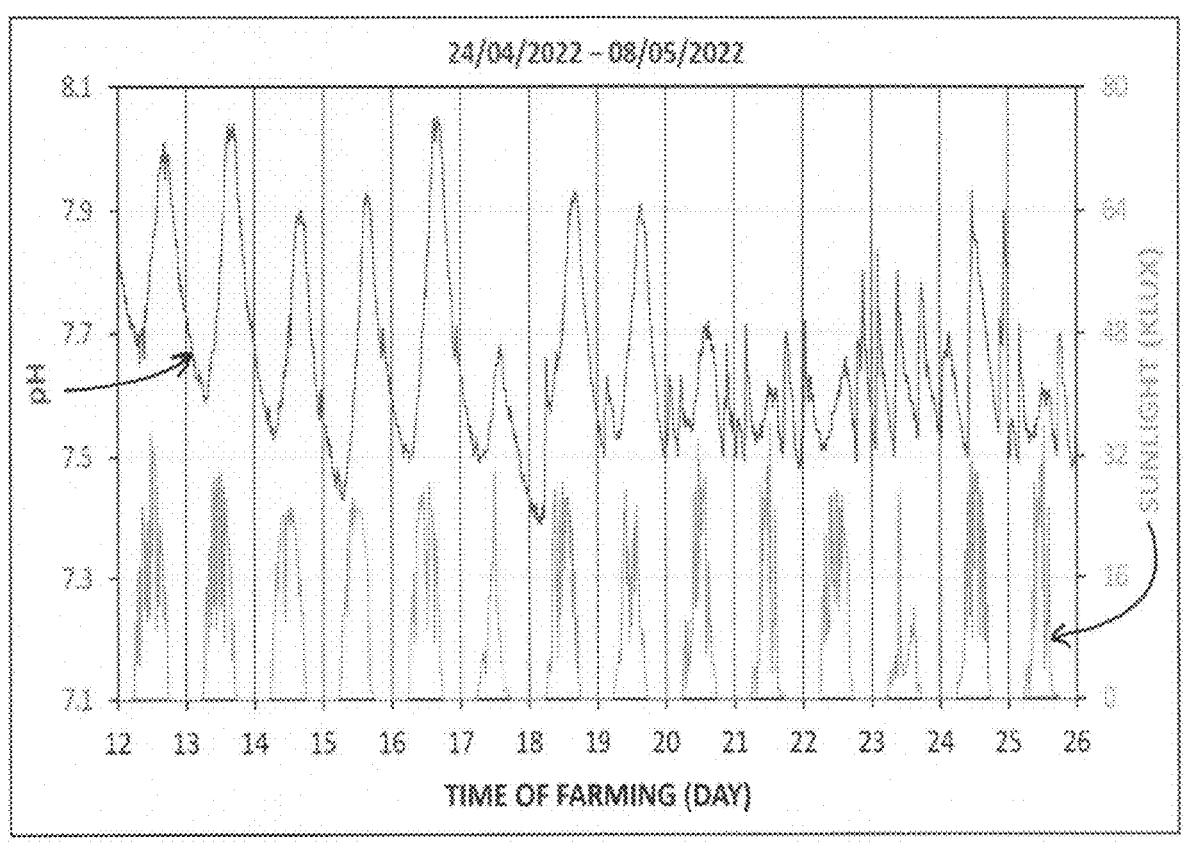
FIG. 15B shows the correlation between pH and sunlight.

Thus, the intensive culture pond according to the example of this invention has a volume of 500 m$^3$. The culture density of shrimp was 300 breeders per m$^3$. Dissolved oxygen concentration is always self-controlled with values of above 8.0 mg/L (FIG. 15A). The pH value was controlled by the amount of algae, microorganisms and CaO to be between 7.5 and 8.0 throughout the crop (FIG. 15B).

Harvested shrimp after 70 days of farming had an average weight of about 16.2 grams/shrimp. The total yield was 1.993 kg. The survival rate is 82%.

Comparative Example (Comparative Pond)

Figure 16A:
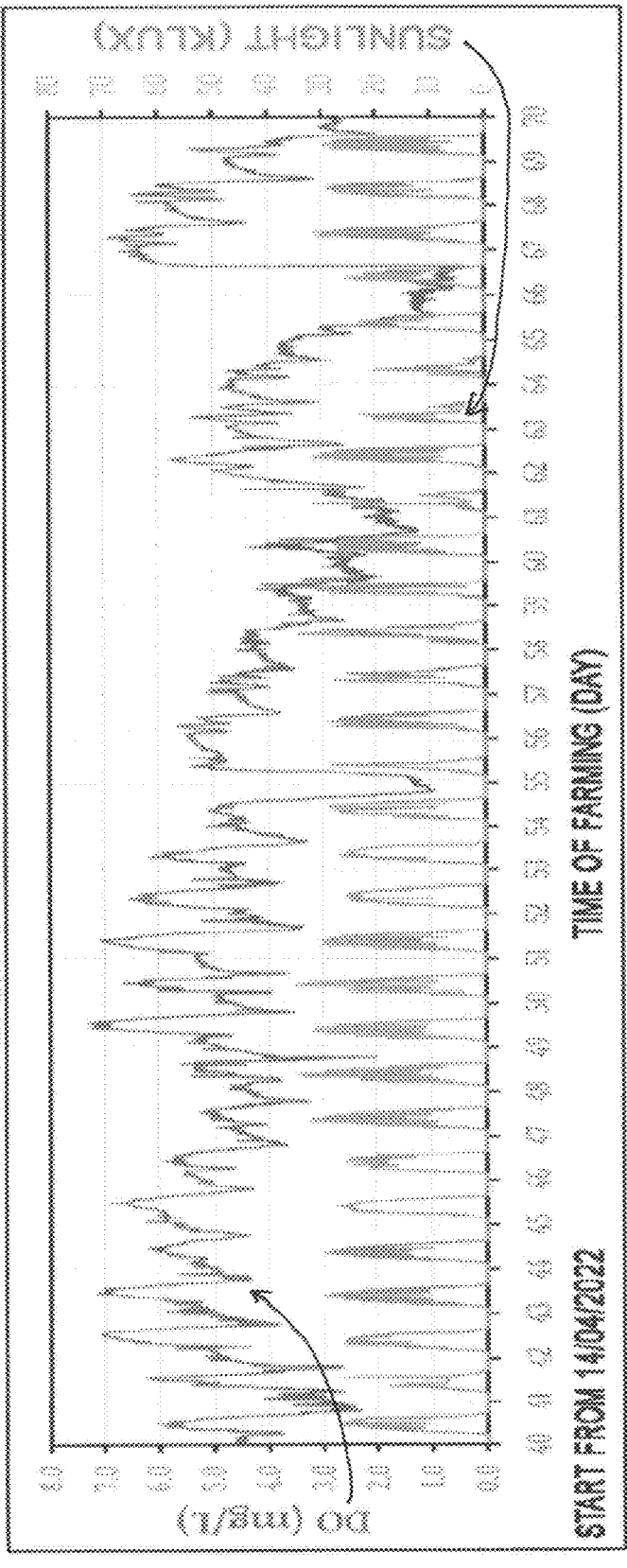
FIG. 16A shows the correlation between dissolved oxygen concentration in shrimp pond and sunlight.
Figure 16B:
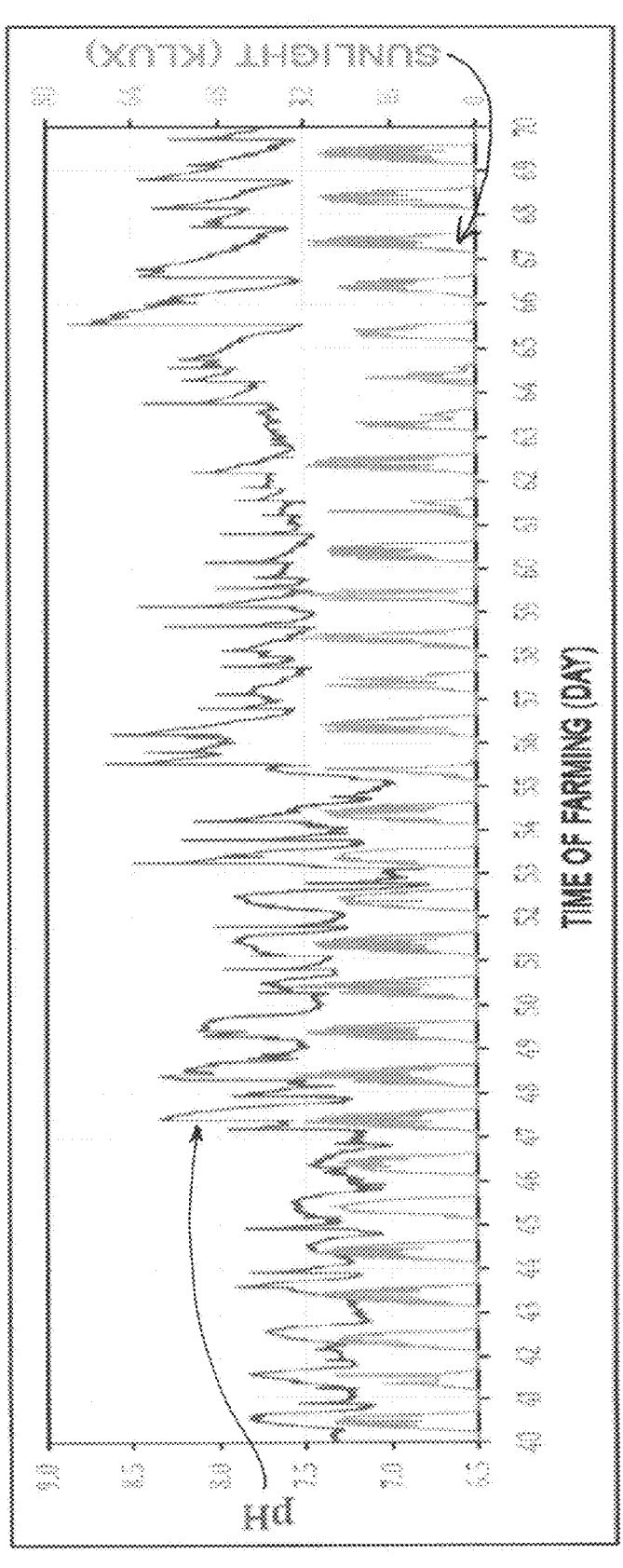
FIG. 16B shows the correlation between pH and sunlight.

In this comparative example, the current model intensive shrimp ponds with a water volume of 500 m$^3$ are stocked with shrimp at a density of 100 shrimps per m$^3$. Mechanical oxygen generation system including air blower (capacity of 2.2 kW) connected to 20 oxygen diffusers located at the bottom of the pond and 8-paddle wheels device floating on water (2.5 kW) to mix air containing about 20.5% oxygen into the water. The system operates continuously 24 hours a day. Dissolved oxygen concentration during the period of 40-70 days of farming were consistently below 7 mg/L (see FIG. 16A). In addition, pH of pond water is also highly variable and unpredictable (FIG. 16B). Therefore, increasing density of shrimp and high intensification are difficult to achieved with current system.

After 70 days of farming, harvested shrimp had an average weight of about 14.7 grams/shrimp. The total yield was 574 kg. The survival rate is 76.5%.

The specific embodiments and examples described above are for illustrative purposes only, and the present disclosure is not limited thereto. The skilled persons may make different modifications or additions or use similar alternatives, but they still will not fall outside or beyond the scope of the invention, which are identified by the claims below.

What is claimed is:

1. An intensive shrimp pond (100) cylindrical in shape with an inverted conical bottom, with a lowest position of the bottom having a slope of 5% to 12% along the radius of a bottom surface of the pond, comprising:

a siphon system (120), including a central hole at the lowest position of the pond and a system of pipes connected to the central hole to drain organic matter out of the shrimp pond;

at least one multi-function device (200);

a floating roof system (500) on a surface of water in the pond; and a light system (600) providing artificial light, wherein the multi-functional device (200) comprises:

a water flow generator (220);

a body (222) having a screw-shaped tubular structure;

an impeller (224) placed inside the body (222)

a motor (221) driving the impeller (224) through a drive shaft (223) to generate a water flow;

a feeder unit (240) for providing food for shrimp including a container (242), a lid (241) located above the container (242), a sensor located inside the container (242) which can sense an amount of food remaining in the container (242), a feed output (243) located below the container (242), a feed dosing motor configured to measure and deliver precise amounts of feed into the shrimp pond (100);

gas dissolving unit (230) for dissolving oxygen molecules into the water of the shrimp pond including a porous ceramic tube (232) with hollow interior, an upper stopper (234) and a lower stopper (235) placed at opposite ends of the porous ceramic tube (232), a plurality of bolts (236) and a matching plurality of nuts (237) to tighten the upper and lower stoppers and fix the porous ceramic tube (232) therebetween, an inlet (233) configured in the upper stopper (234) connecting to the hollow interior of the porous ceramic tube (232), wherein the gas dissolving unit (230) is located inside the body (222) and adjacent to the impeller (224) of the water flow generator (220) and is connected to a pure oxygen supply device; and a support frame (210) configured with a plurality of support levels with the motor (221) of the water flow generator (220) arranged at the highest support level and the body (222) of the water flow generator (220) arranged at the lowest support level so that when placed in the shrimp pond, the device creates one-way laminar flow with a gradually decreasing flow rate from the bottom to the water surface of the shrimp pond; and wherein the floating roof system (500) comprising:

a floating roof (510) comprising a rectangular frame of buoy pipes made of polyvinyl chloride (PVC) and a waterproof cover within the rectangular frame and made of high-density polyethylene (HDPE) with a thickness of at least 0.5 mm and a light transmittance over 40%, and a submerged pump (520) placed in a middle area of the cover.

2. The intensive shrimp pond according to claim 1, further comprising:

a sensor assembly (250) that, when placed under water, allows measurement of water quality indicators selected from the group consisting of dissolved oxygen concentration, pH, salinity, water temperature and turbidity, combined with a sunlight sensor on the water.

3. The intensive shrimp pond according to claim 2, further comprising:

a controller (260) for operating the multi-function device (200), the controller connecting and communicating with the water flow generator and the feeder unit via wiring and/or wireless communication, wherein said controller (260) being configured to receive, from the sensor assembly (250), system data information, then to determine and adjust parameters, and to transmit one or more of the parameters to at least one of the water flow generator and the feeder unit to enable operation according to the transmitted parameters.

4. The intensive shrimp pond according to claim 1, further comprising a seaweed-culturing system (700) having a seaweed-culturing cage (710) with a rectangular-prism frame (711) made of polyvinyl chloride (PVC) pipes, a bottom surface thereof being covered by plastic net (712).

5. The intensive shrimp pond according to claim 1, wherein the light system includes light emitting diode (LED) lights, each LED light includes a plurality of LED bulbs, among which approximately ⅓ are capable of transmitting blue light and ⅔ are capable of transmitting green light and wherein a combination of the LED lights and sunlight provide light for at least 14 hours per day.

6. A method for operating the shrimp pond according to claim 1, the method comprising the steps of:

setting modes and operating the multi-function device;
setting modes and operating the light system;
operating the siphon system; and
operating floating roof system;
wherein the steps of setting modes and operating the multi-function device include:
setting and operating the feeder unit according to manual or automatic mode, wherein in manual mode, the setting of next feeding is based on previous feeding results and in the automatic mode, the setting is predetermined scheduled feeding;
setting pure oxygen supply flow rate from 0 to 180 g/min so that dissolved oxygen in the shrimp pond is higher than saturated dissolved oxygen concentration of about 7.6 mg/L at a geographic location of the shrimp pond; and
setting mode and operating the water flow generator so that the output water flow is between 0 and 20 m³/min.

7. The method according to claim 6, wherein a ratio of flow rate of water flow (L/min) and oxygen flow rate (L/min) is greater than 5,000.

8. The method according to claim 6, wherein the light system includes light emitting diode (LED) lights, each LED light includes a plurality of LED bulbs, among which are blue LED bulbs and green LED bulbs, wherein the steps of setting modes and operating the light system comprise the steps of:

turning on the blue LED bulbs at 00:00 a.m., local time, gradually brightening from 0% to 100% in the first 30 minutes,
turning off the blue LED bulbs at 01:00 a.m., local time,
turning on green LED bulbs at 00:00 a.m., local time, gradually brightening from 0% to 100% in the first 60 minutes, and
turning off the green LED bulbs at 07:00 a.m., local time.

9. The method according to claim 6, wherein the step of operating the siphon system (120) includes:

discharging water through the siphon system regularly at a time interval of about one to about three hours, to discharge a volume out of the pond of about 2% to about 10% of a total volume of the pond per day, and
pumping clean water into the shrimp pond to substantially replenish the amount of discharged volume.

10. The method according to claim 6, wherein the step of operating floating roof system includes:

collecting rainwater on the cover of the floating roof and pumping the collected rainwater off of the floating roof during or after rain.

11. The method according to claim 6, the method further comprising at least one of the steps of:

adding algae and/or alkaline agents to raise the pH of the pond; and
adding microorganisms to reduce the pH of the pond.

12. The method according to claim 11, wherein:

algae and/or alkaline agents are added at a time when the pH of the pond is lower than a predetermined value; and
microorganisms are added at a time when the pH of the pond is higher than the predetermined value.

13. The method according to claim 12, wherein the predetermined value is between 7.5 and 8.0.

14. The method according to claim 13, further comprising the steps of:

obtaining a measurement of the pH of the pond, and
if the measurement indicates pH<7.5, adding alkaline agent and/or algae and reducing or preventing an addition amount of microorganism;
if the measurement indicates 8.0<pH<8.5, reducing an addition amount of algae; and
if the measurement indicates pH>8.5, stop adding algae to the pond until the pH returns to the predetermined value.

15. The method according to claim 11, wherein the alkaline agent comprises a base or a basic oxide, selected from a group consisting of NaOH, KOH, Ca(OH)₂, Na₂O, K₂O and CaO.

16. The method according to claim 11, in which algae are added during day-time and alkaline agents are added at night-time or when sunlight intensity is less than 15 Kilolux or greater than 30 Kilolux.

* * * * *